(12) United States Patent
Chang et al.

(10) Patent No.: US 6,637,262 B2
(45) Date of Patent: Oct. 28, 2003

(54) ELECTRICAL WEAR SENSOR FOR DISC BRAKE

(75) Inventors: Huang Tsang Chang, Dayton, OH (US); Schuyler S. Shaw, Dayton, OH (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/001,106

(22) Filed: Nov. 2, 2001

(65) Prior Publication Data

US 2003/0084714 A1 May 8, 2003

(51) Int. Cl.[7] ............................................. G01M 15/00
(52) U.S. Cl. ......................................................... 73/121
(58) Field of Search .............................. 188/1.11, 71.8, 188/72.6, 72.9, 106, 170, 196; 73/121, 462, 129, 128, 862.12, 460

(56) References Cited

U.S. PATENT DOCUMENTS 3,701,398 A  * 10/1972  Martins ..................... 188/71.8
6,129,183 A  * 10/2000  Ward .......................... 188/1.11
6,272,914 B1  *  8/2001  Ciotti ........................... 73/121

* cited by examiner

*Primary Examiner*—Kamand Cuneo
*Assistant Examiner*—Monica D. Harrison
(74) *Attorney, Agent, or Firm*—Scott A. McBain

(57) ABSTRACT

An apparatus and method are provided for monitoring the wear of brake linings in a disc brake assembly having a caliper mounted in a floating manner on a mounting bracket, by determining a relative distance between the caliper and bracket. Determining the relative distance may be accomplished by attaching a first housing to the mounting bracket, and attaching a second housing to the caliper, with the first and second housings each including a bore facing one another, and aligning the bores with respect to one another along a common translational axis. A plunger inserted in the bores moves along the translational axis within the bores in proportion to lining wear, and the remaining lining thickness is monitored by determining a position of the plunger along the translational axis within the bores. The position of the plunger in the bores may be used for initiating a change in electrical state of an electrical circuit indicative of the relative axial distance of the caliper from the bracket.

18 Claims, 3 Drawing Sheets

ELECTRICAL WEAR SENSOR FOR DISC BRAKE

TECHNICAL FIELD OF THE INVENTION

This invention relates to disc brakes, and more particularly to monitoring wear of brake linings in disc brakes.

BACKGROUND OF THE INVENTION

A typical disc brake assembly includes a pair of brake pads that clamp against the surfaces of the brake disc to slow and stop the disc from turning. The pads include an abradable lining that is unavoidably worn away during operation of the disc brake, with the lining eventually being worn away to a point that the pad must be replaced.

The life of the brake lining is directly related to the manner in which the brake is used. The more frequently the brake is applied to slow the disc, and the higher the speed from which the disc must be stopped, the faster the lining will wear. Because the life of the lining is so highly dependent upon the manner in which a particular brake is operated, it is difficult to predict when the linings will need to be replaced. It is desirable, therefore, to provide some means of monitoring the wear of the lining, and enunciating a warning when the lining has worn to a point where it should be replaced.

In many vehicular applications, the brake linings, or the parts supporting the linings, include a metal clip positioned to rub against the disc and generate an audible squeal when the lining has been worn down to the point of needing replacement. Although such a metal clip is effective in some applications, it is sometimes not audible to an operator sitting in the cabin of a vehicle if the cabin is well insulated to attenuate outside noise from entering the cabin. For disc brakes installed on noisy equipment, the squeal of the clip may not be loud enough to be heard over the noise generated by the equipment.

Where such metal clips are ineffective, or for convenience, it is sometimes desirable that the means for monitoring lining wear be adapted to interact with an electronic monitoring circuit capable of providing a visual or audible enunciation that the lining should be replaced.

In one prior system for electrically monitoring lining wear, an electrical terminal, positioned within a brake pad and lining assembly, comes into contact with a rotating surface of the brake disc when the lining has been worn down to a predetermined minimum acceptable lining thickness. Contact of the electrical terminal with the disc creates an electrical ground through the rotating disc that can be detected by an external electrical circuit, and used to change the state of the circuit for illuminating a warning light, or otherwise electrically enunciating a warning that the brake linings need to be replaced.

Reliability of such prior electrical monitoring systems is compromised, however, by reliance upon the need for completing an electrical circuit through contact of the electrical terminal with the surface of the disc, where both the contact and disc are movable, and operating in a severe environment. As the brake is applied, the lining is abraded away and forms dust that can interfere with operation of the monitoring system. The surface of the disc is also worn away, and may become striated or warped, making contact of the terminal intermittent and unreliable. Considerable heat is also generated each time the brake is applied. For vehicular applications, the disc brake assembly may also be exposed to environmental hazards, such as dust, water, salt spray, and mud. What is needed, therefore, is an improved apparatus and method for monitoring wear in a disc brake lining that provides a solution to one or more of the problems described above.

SUMMARY OF THE INVENTION

Our invention provides an improved method and apparatus for determining lining wear in a disc brake by monitoring the position of the caliper with respect to the mounting bracket supporting the caliper.

One form of our invention provides a method for sensing lining wear in a disc brake assembly having a rotor disc that is rotatable about an axis and a brake caliper adapted for floating attachment to a mounting bracket in a manner providing limited axial movement of the caliper with respect to the bracket as the lining wears away, by determining a relative axial distance of the caliper from the bracket. Because the relative axial distance of the caliper from the bracket changes as the lining is worn away, the remaining distance between the caliper and the mounting bracket is representative of the remaining thickness of the lining. Where it is desirable to have an external electrical circuit enunciate lining condition, our method may further include initiating a change in electrical state of the electrical circuit indicative of the relative axial distance of the caliper from the bracket.

Our invention may be practiced by attaching a first housing to the mounting bracket, and attaching a second housing to the caliper, with the first and second housings each including a bore facing one another, and aligning the bores with respect to one another along a common translational axis. A plunger is inserted in the bores for movement along the translational axis within the bores in proportion to lining wear, and the remaining lining thickness is monitored by determining a position of the plunger along the translational axis within the bores. The position of the plunger in the bores may be used for initiating a change in electrical state of an electrical circuit indicative of the relative axial distance of the caliper from the bracket.

Our invention may also take the form of an apparatus for sensing lining wear in a disc brake assembly having a rotor disc that is rotatable about an axis and a brake caliper adapted for floating attachment to a mounting bracket in a manner providing limited movement of the caliper with respect to the bracket in a direction parallel to the axis as the lining wears away. The apparatus is adapted for connection to an electrical circuit and includes components for determining a relative axial distance of the caliper from the bracket; and components for initiating a change in electrical state of the electrical circuit indicative of the relative axial distance of the caliper from the bracket.

In one form of our invention, the apparatus includes a pair of fixed electrical contacts adapted for connection to the electrical circuit and a movable electrical contact for connecting the pair of electrical contacts to provide a series electrical circuit through the movable electrical contact.

The apparatus may further include a first housing adapted for attachment to the mounting bracket, and a second housing adapted for attachment to the caliper, with the first and second housings each including a bore facing one another and aligned with respect to one another along a common translational axis. A plunger is disposed in the bores and is movable along the translational axis within the bores. A movable electrical contact may be immovably affixed to the plunger. The plunger may also have an enlarged end thereof disposed within the bore of the second housing, and second housing may include a stop at an end of the bore facing the first housing configured to bear against the enlarged end of the plunger and thereby resist further movement of the plunger along the translational axis toward the first housing. The plunger and bore in the second housing may have a length and depth respectively allowing the plunger to move along the translational axis within the bore from a first position at which the enlarged end of the plunger is not in contact with the stop at the end of the bore, to a second position at which the enlarged end of the plunger contacts the stop. The distance of travel along the translational axis between the first and second positions may be predetermined to be substantially equal to the difference between a lining thickness of a new lining and a minimum recommended lining thickness.

The apparatus may further include components for restraining the plunger within the bore of the second housing against movement along the translational axis until the enlarged end of the plunger comes into contact with the stop in the bore of the first housing at the second position. The restraining components may be configured to allow the plunger to be pulled along the translational axis by further relative movement of the first and second housings away from one another after the enlarged end contacts the stop. Further relative movement of the first and second housings away from one another after the enlarged end of the plunger contacts the stop in the first housing may initiate a change in state of an external electrical circuit.

Where a movable electrical contact is affixed to the plunger, further relative movement of the first and second housings away from one another after the enlarged end of the piston contacts the stop in the first housing may initiate the change in state of the electrical circuit by breaking the series circuit through the movable electrical contact, or alternatively by completing the series electrical circuit through the movable electrical contact. In some forms of our invention the apparatus may also have an additional electrical contact for providing a series circuit relationship with the movable contact indicative of an intermediate lining thickness.

Our invention may also take the form of an apparatus having: a rotor disc that is rotatable about an axis of rotation; a mounting bracket adapted for floating attachment of a brake caliper; a brake caliper adapted to receive the lining and adapted for floating attachment to the mounting bracket in a manner providing limited movement of the caliper with respect to the bracket, in a direction parallel to the axis of rotation, as the lining wears away; a first housing adapted for attachment to the mounting bracket, and a second housing adapted for attachment to the caliper, with the first and second housings each including a bore, the bores being aligned with respect to one another and opening toward one another along a common translational axis; a plunger disposed in the bores and movable along the translational axis within the bores in proportion to lining wear; and components for determining a position of the plunger along the translational axis within the bores. The mounting bracket and caliper may include means for aligning the bores in the first and second housings respectively along the translational axis.

Our invention may be readily adapted for use with prior disc brake assemblies. Because our invention does not rely on making electrical contact with the rotating brake disc, problems associated with electrically monitoring lining wear in prior systems are overcome. Because our invention may be practiced in an apparatus having a housing providing environmental protection for components utilized for determining lining wear and initiating a change in electrical state, reliability is enhanced.

The foregoing and other features and advantages of the invention will become further apparent from the following detailed description of exemplary embodiments, read in conjunction with the accompanying drawings. The detailed description and drawings are merely illustrative of the invention rather than limiting, the scope of the invention being defined by the appended claims and equivalents thereof.

DETAILED DESCRIPTION OF THE PRESENTLY PREFERRED EMBODIMENTS

Figure 1:
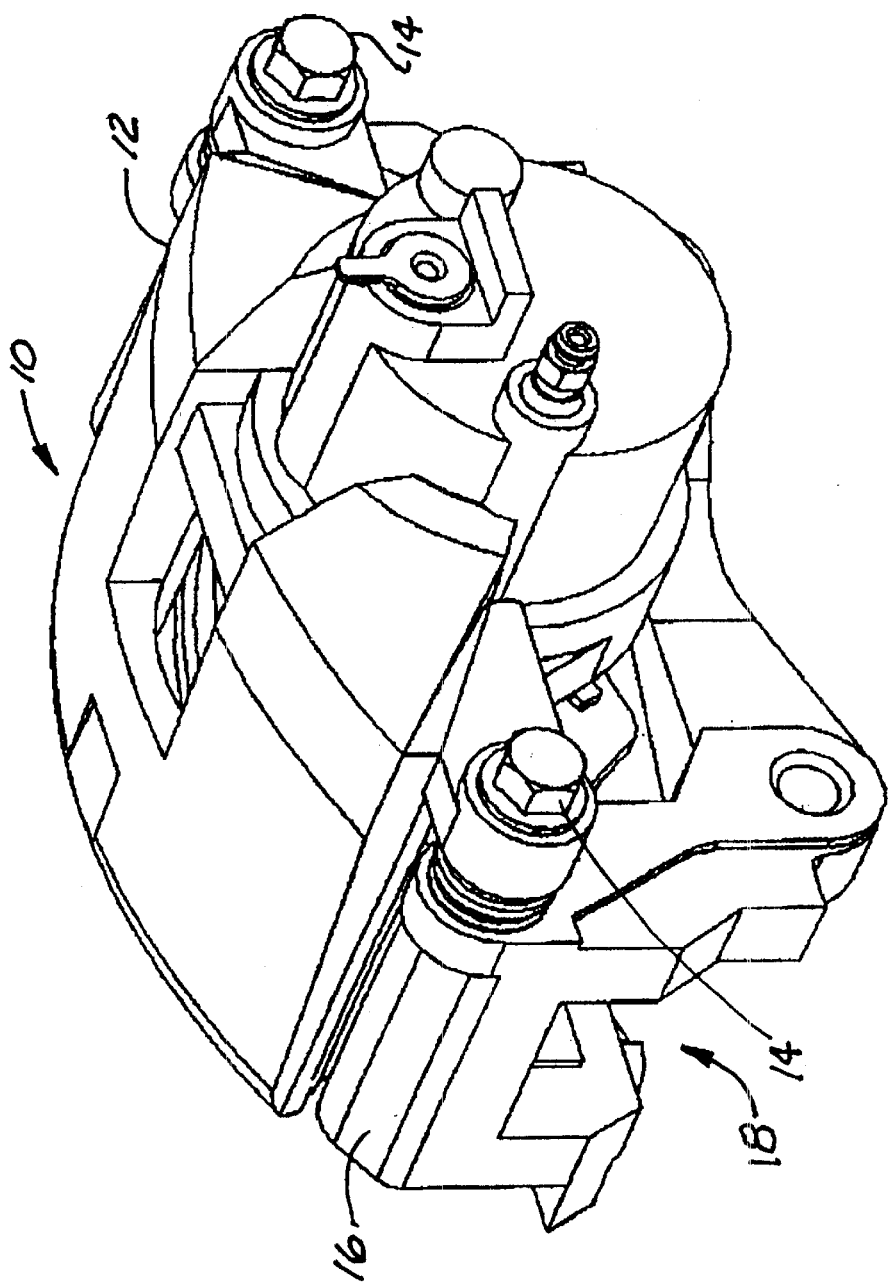
FIG. 1 is an isometric view of a disc brake caliper and mounting bracket.
Figure 2:
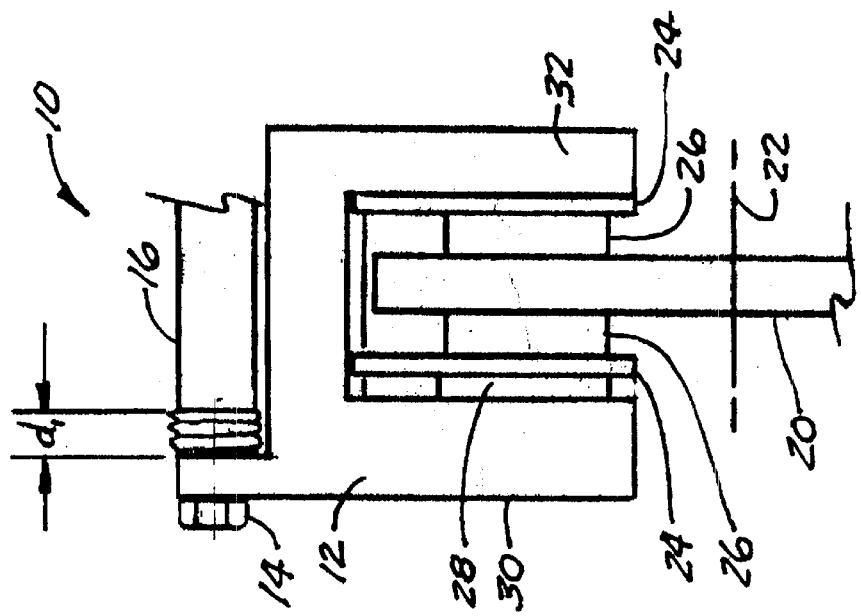
FIGS. 2 and 3 are schematic diagrams of a disc brake assembly respectively showing the relative position of the caliper to the mounting bracket with a new set of linings, and with a set of linings which have been worn down to about half of the original lining thickness.
Figure 3:
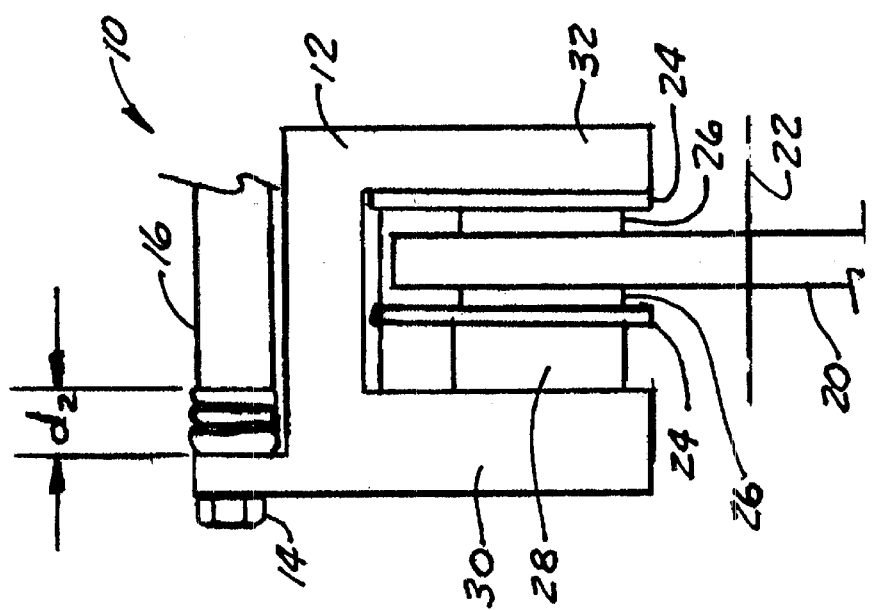

FIG. 1 depicts a disc brake assembly 10 having a caliper 12, attached by guide pins, or bolts 14 to a mounting bracket 16. As shown in FIGS. 1–3, the caliper 12 includes a circumferential slot 18 configured to straddle a portion of a rotor disc 20 of the disc brake assembly 10. The rotor disc 20 is rotatable about an axis of rotation 22 in a plane of rotation that is fixed with respect to the mounting bracket 16.

The slot 18 is further configured to accommodate and retain a pair of brake pads 24 in an axially sliding arrangement on either side of the disc 20. Each brake pad 20 includes a lining 26. The caliper 12 further includes a piston 28 that extends from the left leg 30, as illustrated in FIGS. 2 and 3, of the caliper 12 into the circumferential slot 18 and bears against the left pad 24 to urge the lining 26 of the left pad 24 into contact with the left side of the disc 20.

The caliper 12 and guide pins 14 are configured to allow the caliper 12 to float in a direction parallel to the axis 22 as the piston 28 bears against the left side of the disc 20. This floating arrangement allows the caliper 12 to be pushed to the left in reaction to the pressure exerted by the piston 28 against the left pad 24, which in turn pulls the right leg 32 and the lining 26 of the right pad 24 into contact with the right side of the disc 20, in such a manner that the disc 20 is clamped between the linings 26 of the brake pads 24, thereby slowing or stopping rotation of the disc 20 about the axis 22.

FIG. 2 illustrates a relative distance "$d_1$" between the mounting bracket 16 and the caliper 12 at a point in time when the linings 26 are relatively new, and have not been worn away through operation of the brake 10. FIG. 3 illustrates that, after the brake linings 26 have been worn down by operation of the brake 10, the caliper 12 must move farther to the left in order for the piston 28 to clamp the disc 20 between the linings 26, which results in the relative distance "$d_2$" between the caliper 12 and mounting bracket 16 increasing by an amount proportional to the reduction of thickness of the linings 26.

Figures 4, 5:
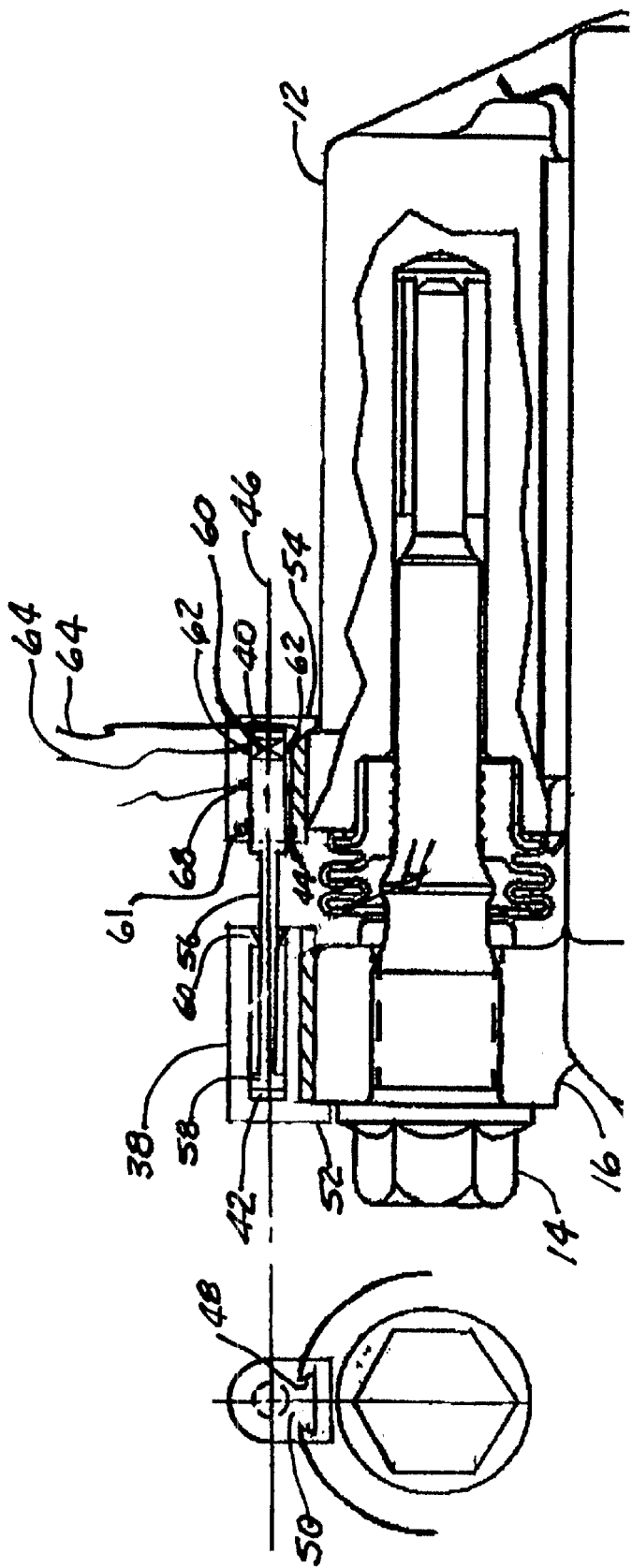
FIG. 4 is a partial sectional view of a brake lining wear monitoring apparatus, according to our invention.
FIG. 5 is an end view of the apparatus shown in FIG. 4.

FIGS. 4 and 5 depict an exemplary apparatus 36, according to our invention, for sensing lining wear in a disc brake assembly 10 by determining a relative axial distance (i.e. $d_1$, or $d_2$) of the caliper 12 from the bracket 16. The apparatus 36 also includes components, described in detail below, for initiating a change in state of an electrical circuit external to the apparatus 26 indicative of the relative distance of the caliper 12 from the bracket 16.

The apparatus 36 includes a first housing 38 adapted for attachment to the mounting bracket 16, and a second housing 40 adapted for attachment to the caliper 12. The first and second housings 38, 40 each include a bore 42, 44, aligned with one another along a common translational axis 46. The mounting bracket 16 and caliper 12 include means in the form of a dovetail shaped slot 48 for receiving a dovetail shaped alignment rib 50 extending from the first and second housings 38, 40 for aligning the bores 42, 44 along the translational axis 46. The first and second housing 38, 40 each also include a positioning tab 52, 54 for axially positioning the first and second housings 38, 40 with respect to the mounting bracket 16 and caliper 12. The first and second housing 38, 40 are immovably affixed to the the mounting bracket 16 and caliper 12 respectively, with an adhesive, or a fastener (not shown), in such a manner that the second housing 40 moves along the translational axis 46 as the caliper 12 moves axially with respect to the mounting bracket 16. Those having skill in the art will recognize, however, that the housings 38, 40 can be affixed to the mounting bracket 16 and caliper 12 in a number of other ways within the scope of our invention.

A plunger 56 is disposed within the bores 42, 44 in the first and second housings 38, 40. The bores 42, 44 and the plunger 56 are sized such that the plunger 56 is movable in a sliding manner along the translational axis 46 within the bores 42, 44.

The plunger 56 includes an enlarged end 58 thereof within the bore of the first housing 38, and the first housing 38 includes a stop 60 at the end of the bore 42 in the first housing 38 facing the second housing 40. The stop 60 is configured to bear against the enlarged end 58 of the plunger 56 to resist further movement of the plunger 56 along the translational axis 46 toward the second housing 40 when the plunger 56 has reached the right end (as shown in FIG. 4) of the bore 42 in the first housing 38.

The apparatus 36 further includes components or features for restraining the plunger 56 within the bore 44 of the second housing 40 against movement along the translational axis 46, until the enlarged end 58 of the plunger 56 comes into contact with the stop 60 in the bore 42 of the first housing 38. These components or features for restraining the plunger may include a seal 61, electrical contacts, as described in more detail below, or shaping the end of the plunger 56 and the bore 44 in the second housing 40 to provide a relatively tight, sliding fit between one another. It is further contemplated that the end of the plunger 56 in the bore 44 of the second housing 40 be configured in a manner allowing the plunger 56 to be pulled out of, and be re-inserted in, the bore 44 in the second housing 40, to facilitate installation of the apparatus 36 and servicing of the disc brake 10.

For applications of our invention where the plunger 56 is visible between the caliper 12 and the mounting bracket 16, the plunger 56 may be marked with indications, such as green and red bands, to visually communicate an indication of lining wear and the need to replace the linings 26.

For applications of our invention where the plunger 56 cannot be conveniently viewed, or in applications where a remote indication is desired, an apparatus 10 or method according to our invention may include the use of components for electrically sensing the relative position of the caliper 12 and bracket 16, and initiating a change in electrical state of an external electrical circuit.

As shown in FIG. 4, the second housing 40 of the apparatus 10 may include a pair of fixed electrical contacts 62 in the bore 44 adapted for attachment, such as through wires 64, to an external electrical circuit (not shown). A movable electrical contact 66 is attached to the plunger 56 to be immovable with respect to the plunger, but movable with the plunger 56 as the plunger 56 moves along the translational axis 46 within the bore 44 of the second housing 40. The movable contact 66 is further configured for connecting the pair of fixed contacts 62 in a first position, as shown in FIG. 4, to form a normally closed switch when the enlarged end 58 of the plunger 56 is not in contact with the stop 60 of the first housing 38.

When the linings 26 have worn to the point that the enlarged end 58 contacts the stop 60 at a second position, further wear will pull the plunger 56 and movable electrical contact 66 out of the first position, to a position at which the movable contact 66 will no longer connect the fixed electrical contacts 62, thereby breaking the electrical connection through the fixed and movable contacts 62, 66. Breaking of the electrical connection may be sensed by the external electrical circuit and used to initiate a change in electrical state of the circuit to trigger enunciation of a visual or audible warning at a remote location, such as on the dashboard or in the interior of a motor vehicle, that the linings 26 should be replaced.

Those having skill in the art will recognize that when utilizing the electrical components described above, it may be advantageous to construct one or more of the first and second housings 38, 40 and plunger 56 at least partially from an electrically non-conducting material, such as plastic. It will also be understood that the fixed and movable contacts 62, 66 could be alternatively configured and positioned in such a manner that the circuit through the fixed and movable contacts 62, 66 would be normally open when the plunger 56 is in the first position, and closed in the second position.

The second housing 40 may also include one or more additional electrical contacts 68, adapted for attachment to the external electrical circuit, that may be used to initiate changes in state of the external circuit indicating an intermediate degree of wear on the linings 26. Those having skill in the art will also recognize that there are many other ways that the position of the plunger may be sensed electrically within the scope of our invention. For example, a magnetic sensing switch may be used in place of the fixed and movable electrical contacts 62, 66. Other types of sensors employing electromagnetic or radio frequency position sensing, or strain gages may also be utilized in practicing our invention.

While we presently consider it preferable to have the components of an assembly 10 according to our invention arranged as described above, we wish to expressly state that in alternate forms of our invention the first housing may be attached to the caliper and the second housing may be attached to the mounting bracket. The components for sensing the position of the plunger and initiating a change in the state of the external circuit, such as the fixed and movable electrical contacts, may alternatively be incorporated into the first housing.

While the embodiments of my invention disclosed herein are presently considered to be preferred, various changes and modifications can be made without departing from the spirit and scope of the invention. The scope of the invention is indicated in the appended claims, and all changes or modifications within the meaning and range of equivalents are intended to be embraced therein.

We claim:

1. An apparatus for sensing lining wear in a disc brake assembly having a rotor disc that is rotatable about an axis and a brake caliper adapted for floating attachment to a mounting bracket in a manner providing limited movement of the caliper with respect to the bracket in a direction parallel to the axis as the lining wears away, the apparatus adapted for connection to an electrical circuit and comprising:

means for determining a relative axial distance of the caliper from the bracket;
    means for initiating a change in electrical state of the electrical circuit indicative of the relative axial distance of the caliper from the bracket; and
    a pair of fixed electrical contacts adapted for connection to the electrical circuit and a movable electrical contact for connecting the pair of electrical contacts to provide a series electrical circuit through the movable electrical contact.

2. The apparatus of claim 1 further comprising;
    a first housing adapted for attachment to the mourning bracket, and a second housing adapted for attachment to the caliper, the first and second housings each including a bore, the bores being aligned with respect to one another along a common translational axis; and
    a plunger disposed in the bores and movable along the translational axis within the bores, the movable electrical contact being immovably affixed to the plunger.

3. The apparatus of claim 2 wherein:
    the plunger includes an enlarged end thereof disposed within the bore of the first housing; and
    the first housing includes a stop at an end of the bore facing the second housing configured to bear against the enlarged end of plunger and thereby resist further movement of the plunger along the translational axis toward the second housing.

4. The apparatus of claim 3 wherein the plunger and bore in the first housing have a length and depth respectively allowing the plunger to move along the translational axis within the bore from a first position at which the enlarged end of the plunger is not in contact with the stop at the end of the bore, a second position at which the enlarged end of the plunger contacts the stop.

5. The apparatus of claim 4 wherein the distance of travel along the translational axis between the first and second positions is predetermined to be substantially equal to the difference between a lining thickness of a nee lining and a minimum recommended lining thickness.

6. The apparatus of claim 4 further including means for restraining the plunger within the bore of the second housing against movement along the translational axis until the enlarged end of the plunger comes into contact with the stop in the bore of the first housing at the second position, the restraining means allowing the plunger to be pulled along the translational axis by further relative movement of the first and second housings away from one another after the enlarged end contacts the stop.

7. The apparatus of claim 6 wherein further relative movement of the first and second housings away from one another after the enlarged end of the plunger contacts the stop in the first housing initiates the change in state of the electrical circuit.

8. The apparatus of claim 6 wherein further relative movement of the first and second housings away from one another after the enlarged end of the piston contacts the stop in the first housing initiates the change in state of the electrical circuit by breaking the series circuit through the movable electrical contact.

9. The apparatus acclaim 6 wherein further relative movement of the first and second housings away from one another after the enlarged end of the piston contacts the stop in the first housing initiates the change in state of a electrical circuit by completing the series electrical circuit through the movable electrical contact.

10. The apparatus of claim 1 further comprising an additional electrical contact for providing a series circuit relationship with the movable contact.

11. An apparatus for sensing lining wear in a disc brake, the apparatus comprising:
    a rotor disc that is rotatable about an axis of rotation;
    a mounting bracket adapted for floating attachment of a brake caliper;
    a brake caliper adapted to receive the lining and adapted for floating attachment to the mounting bracket in a manner providing limited movement of the caliper with respect to the bracket, in a direction parallel to the axis of rotation, as the lining wears away;
    a first housing adapted for attachment to the mounting bracket, and a second housing adapted for attachment to the caliper, the first and second housings each including a bore, the bores being aligned with respect to one another along a common translational axis;
    a plunger disposed in the bores and movable along the translational axis within the bores in proportion to lining wear; and
    means for determining a position of the plunger along the translational axis within the bores.

12. The apparatus of claim 11 wherein the mounting bracket and caliper include means for aligning the bores in the first and second housings respectively along the translational axis.

13. An apparatus for sensing lining wear in a disc brake, the apparatus comprising:
    a rotor disc that is rotatable about an axis of rotation;
    a mounting bracket adapted for floating attachment of a brake caliper;
    a brake caliper adapted to receive the lining and adapted for floating attachment to the mounting bracket in a manner providing limited movement of the caliper with respect to the bracket in a direction parallel to the axis of rotation, as the lining wears away;
    a first housing adapted for attachment to the mounting bracket and a second housing adapted for attachment to the caliper, the first and second housing each including a bore, the bores being aligned with respect to one another along a common translational axis;
    the mounting bracket and caliper including means for aligning the bores in the first and second housing respectively along the translational axis
    a plunger disposed in the bores and movable along the translational axis within the bores in proportion to lining wear;
    means for determining a position of the plunger along the translational axis within the bores; and
    sensing means for electrically determining the position of the plunger within the bores and adapted for electrical connection to an external electrical circuit.

14. The apparatus of claim 13 wherein the sensing means further comprise means for initiating a change in electrical state of the electrical circuit indicative of the position of the plunger within the bores.

15. A method for sensing lining wear in a disc brake assembly having a rotor disc that is rotatable about an axis and a brake caliper adapted for floating attachment to a mounting bracket in a manner providing limited axial movement of the caliper with respect to the bracket as the lining wears away, the method comprising determining a relative axial of the caliper from the bracket by:

attaching a first housing to the mounting bracket, and attaching a second housing to the caliper, the first and second housings each including a bore, and aligning the bores with respect to one another along a common translational axis;

inserting a plunger in the bores for movement along the translational axis within the bores in proportion to lining wear; and determining a position of the plunger along the translational axis within the bores.

16. The method of claim 15 further compromising initiating a change in electrical state of an electrical circuit indicative of the relative axial distance of the caliper from the bracket.

17. The method of claim 15 further compromising electrically sensing the position of the plunger within the bores.

18. A method for sensing lining wear in a disc brake assembly having a rotor disc that is rotatable about an axis and a brake caliper adapted for floating attachment to a mounting bracket in a manner providing limited axial movement of the caliper with respect to the bracket as the lining wears away, the method comprising determining a relative axial distance of the caliper from the bracket by:

attaching a first housing to the mounting bracket, and attaching a second housing to the caliper, the first and second housings each include a bore, and aligning the bores with respect to one another along a common translational axis;

inserting a plunger in the bores for movement along the translational axis within the bores in proportion to lining wear;

determining a position of the plunger along the translational axis within the bores;

electrically sensing the position of the plunger within the bores; and initiating a change in electrical state of an electrical circuit indicative of the relative axial distance of the caliper from the bracket.

* * * * *